J. R. Bailey,

Tool Holder.

No. 98,838.   Patented Jan. 18, 1870.

Attest:
O. E. Duffields
F. Somes

Inventor
Joseph R. Bailey
By D. E. Somes & Co.
Attorneys

United States Patent Office.

JOSEPH R. BAILEY, OF WOONSOCKET, RHODE ISLAND, ASSIGNOR TO HIMSELF AND SELDEN A. BAILEY, OF SAME PLACE.

Letters Patent No. 98,838, dated January 18, 1870.

IMPROVED TOOL-HOLDER.

The Schedule referred to in these Letters Patent and making part of the same.

*To all whom it may concern:*

Be it known that I, JOSEPH R. BAILEY, of Woonsocket, in the county of Providence, and in the State of Rhode Island, have invented a new and useful Improved Tool-Holder; and I do hereby declare that the following is a full, clear, and exact description thereof, reference being had to the annexed drawings, making part of this specification, in which—

The same letters are used in all the figures to designate identical parts.

Figure 1:
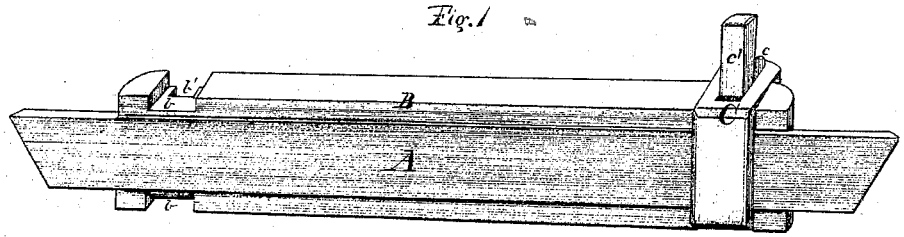
Figure 1 is a perspective view of the holder, and tool arranged therein.
Figure 2:
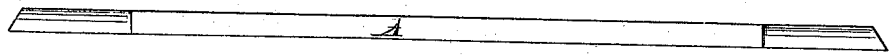
Figure 2 is an edge view of a tool.
Figure 3:
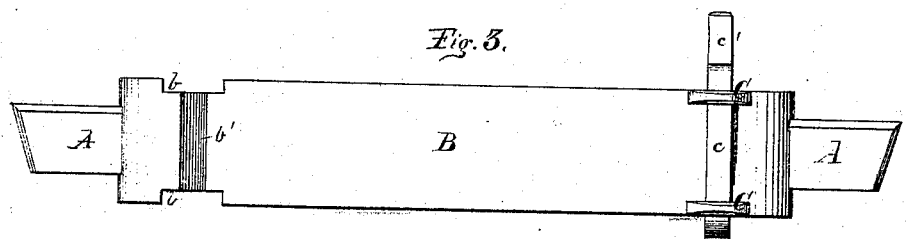
Figure 3 is a rear elevation of the holder and tool.

My invention consists in the construction of a tool-holder, and its combination with a tool, as hereinafter more fully set forth.

To enable those skilled in the art to make and use my invention, I will proceed to describe its construction and operation.

A, in the drawings, represents a suitable tool, which may be, preferably, a bar of tempered steel, of uniform size throughout its entire length, about one-fourth of an inch in thickness, and suitably grooved at each end to form cutting-points, and make it adaptable for right or left-hand work by turning it end for end.

This tool is to be confined in a holder, B, which consists of a bar of iron, or other metal, provided with a groove or recess, B′, in one side, extending from end to end thereof, into which the cutter is to be snugly fitted.

Near each end, this bar has notches, $b\ b$, formed in its edges, so as to reduce it in width at these points sufficiently to receive the clip C; and upon its rear side, transverse grooves, $b'$, are formed, to admit the gib and key, by which the clip is made to draw the tool and holder together tightly.

C represents the clip, the jaws of which fit snugly in the notches $b\ b$ of the bar B.

Figure 4:
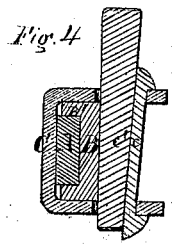
Figure 4 is a transverse section, on line $xx$ of fig. 3.

Suitable apertures are formed in its jaws, for the reception of the gib $c$ and key $c'$, by means of which it is made to confine the tool, as clearly shown in fig. 4.

The design is to use the clip for confining whichever end of the tool is to be used.

What I claim as new, and desire to secure by Letters Patent, is—

A tool-holder, consisting of the bar B, for receiving the tool, and the clip C, with gib and key, for confining the same, substantially as shown and described.

The above specification signed by me, this 1st day of November, 1869.

JOSEPH R. BAILEY.

Witnesses:
WM. H. BAILEY,
JOHN P. WHIPPLE.